C. H. BEDELL & G. E. EDGAR.
VENTILATING AND COOLING SYSTEM FOR BATTERIES.
APPLICATION FILED AUG. 7, 1911.
1,036,063. Patented Aug. 20, 1912.
2 SHEETS—SHEET 1.
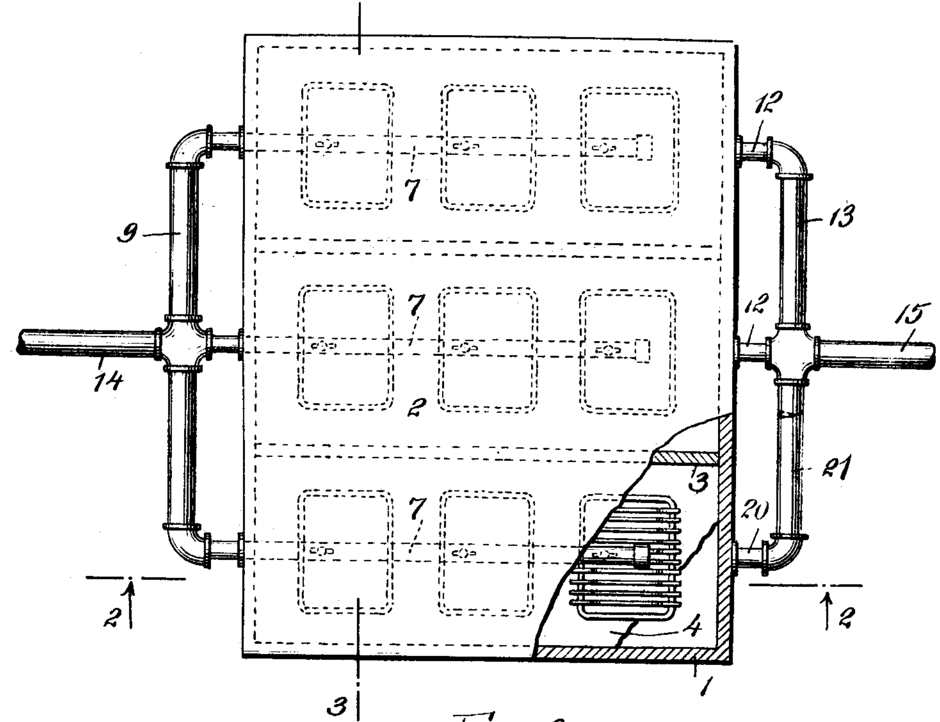
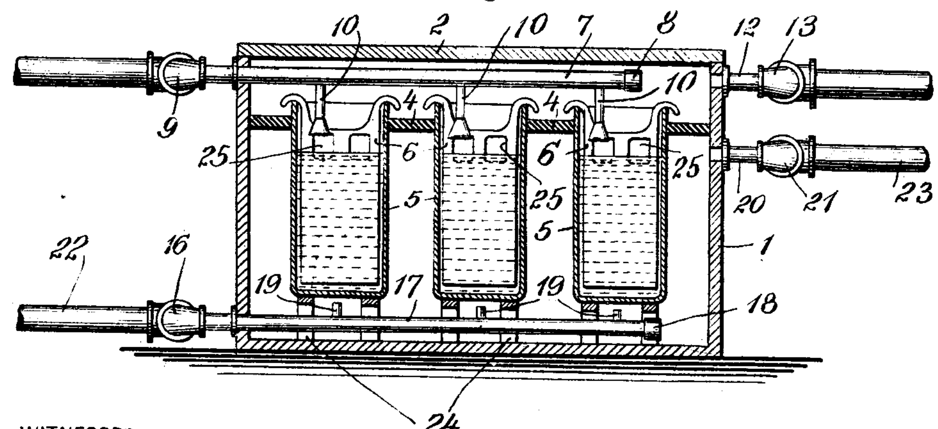
WITNESSES:
Thos. J. Maguire
[illegible] Hennessy
INVENTORS
Charles H. Bedell
& Grant E. Edgar
BY
Pennie, Davis & Goldsborough
ATTORNEYS

C. H. BEDELL & G. E. EDGAR.

VENTILATING AND COOLING SYSTEM FOR BATTERIES.

APPLICATION FILED AUG. 7, 1911.

1,036,063. Patented Aug. 20, 1912.

2 SHEETS—SHEET 2.

WITNESSES:

Thos. J. Maguire

[illegible]

INVENTORS

Charles H. Bedell & Grant E. Edgar

BY

Pennie, Davis & Goldsborough

ATTORNEYS

UNITED STATES PATENT OFFICE.

CHARLES H. BEDELL AND GRANT E. EDGAR, OF NEW LONDON, CONNECTICUT.

VENTILATING AND COOLING SYSTEM FOR BATTERIES.

1,036,063. Specification of Letters Patent. Patented Aug. 20, 1912.

Application filed August 7, 1911. Serial No. 642,610.

*To all whom it may concern:*

Be it known that we, CHARLES H. BEDELL and GRANT E. EDGAR, citizens of the United States, residing at New London, in the county of New London and State of Connecticut, have invented certain new and useful Improvements in a Ventilating and Cooling System for Batteries; and we do hereby declare the following to be a full, clear, and exact description of the invention, such as will enable others skilled in the art to which it appertains to make and use the same.

This invention relates to a ventilating and cooling system for battery installations, and more particularly to one for storage cells inclosed in tanks or compartments in submarine boats or like places where the surrounding water or air is at a comparatively high temperature.

The ordinary systems of ventilation for removing the gases generated during the charging process and for cooling the cells during charging and discharging processes, are not sufficient for these purposes in tropical climates.

The particular object of this invention is to provide a ventilating and cooling system sufficient even for such climates, wherein the noxious gases generated during the charging process are efficiently removed and wherein the electrolyte is kept below an undesirable temperature at all times. The object is attained by discharging air, artificially cooled if desired, from separate pipes extending close to the surface of the electrolyte in each cell, and also discharging air or other cooling medium from other pipes exteriorly of the cells, so as to efficiently cool them, both interiorly and exteriorly; in combination with means for dividing the tank into gas tight compartments whereby the pocketing of noxious gases is prevented and the cooling mediums are kept apart.

Figure 3:
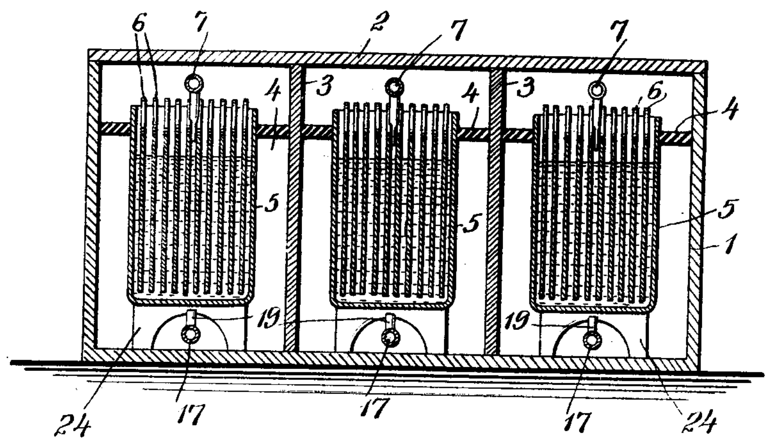
Figure 4:
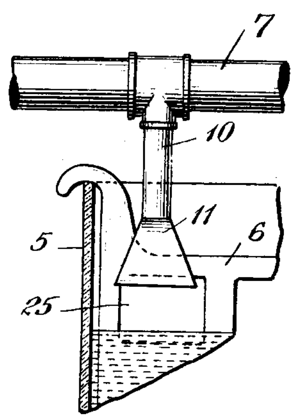
Figure 5:
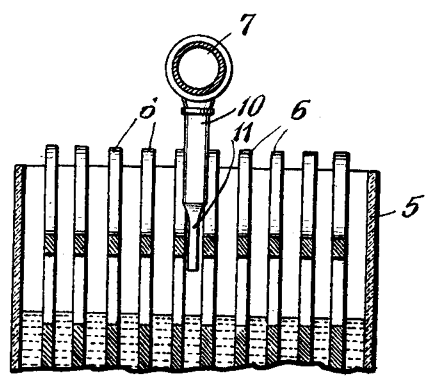

In the accompanying drawings illustrating the preferred embodiment of our invention, Figure 1 is a plan view of a battery installation wherein the top cover and the horizontal partition are partly broken away to show the interior of the compartments; Fig. 2 is a vertical transverse section on line 2—2 of Fig. 1; Fig. 3 is a vertical longitudinal section on line 3—3 of Fig. 1; Fig. 4 is an enlarged view of the branch connection for supplying air near the surface of the electrolyte; and Fig. 5 is an enlarged view at right angles to Fig. 4.

The tank 1 consists of a bottom part and sides in the form of an ordinary box or compartment, and has a cover 2 which may fit with a water tight joint or otherwise. The tank is divided into smaller compartments by the transverse vertical partitions 3 which extend from the bottom of the tank to the top thereof, so that when the cover is in place the adjoining compartments may be maintained gas tight to prevent the cooling medium from passing from one compartment to another. However, this arrangement may be modified so that the separate compartments are in communication with one another. The horizontal partitions 4 are closely fitted to the sides of the tank and to the cells to maintain a gas-tight joint between the upper compartment and the lower compartment, so that the cooling medium which is circulated interiorly of the cells in the upper compartment is kept apart from the cooling medium which is circulated exteriorly of the cells in the lower compartment. In this way, if the cooling medium circulated exteriorly of the cells in the lower compartment is air, the mixture of air and the noxious gas which results in cooling the interior of the cells is prevented from passing from the upper compartment to the lower compartment and becoming pocketed in the lower compartment to form explosive and highly destructive mixtures. If the medium for cooling the exterior of the cells is a liquid, the horizontal partitions prevent the liquid from rising into the upper compartment and flooding the cells.

Each of the cells has a jar 5, of rubber, wood or other suitable material, in which ordinary battery plates 6 with openings 25 are placed in the usual manner, the cells being supported from the bottom of the tank by stands 24. These plates are provided with the ordinary lugs for supporting them from the sides of the cell. In some cases the electrolyte does not reach the top of the plates so that the air space just above the electrolyte and between the compactly arranged plates is considerably restricted, while in other cases the electrolyte covers all of the plates excepting the connecting lugs.

Although the construction may be variously modified we prefer to provide for each upper compartment a ventilating pipe closed at its outer end by a cap 8 and connected at its other end to a common inlet header 9. From each of the inlet pipes 7 there is a series of branch connections 10 extending to points between the plates and close to the surface of the electrolyte, as shown best in Figs. 4 and 5. In order to distribute the circulating air close to the surface of the electrolyte where the plates extend above the level of the electrolyte, each of the connections are provided on its outer end with a flattened spout 11 of such thickness as to readily pass between the compactly arranged plates and of such length as may be necessary to effectively distribute the air over the surface of the electrolyte between the plates whereby the electrolyte in each cell may be individually and efficiently cooled and the noxious gases efficiently removed. Where the electrolyte covers the plates the spout need not be flattened to such an extent, although it is desirable to flare the outlet in order to distribute the cooling medium over a large surface of the electrolyte. With this construction, we provide an outlet 12 communicating with each of the upper compartments and connected to a common outlet header 13. For circulating the air through the upper compartments, we may use a forced draft system, in which the discharge end of the blower should be connected to the inlet pipe 14, or we may use a suction system in which case the suction end of the blower should be connected to the outlet pipe 15.

The pipes for supplying the cooling medium to the lower compartments are similar to those described above for the upper compartments, consisting of an inlet header 16 and a pipe 17 closed at its outer end by a cap 18 and extending within each of the lower compartments. If the cooling medium for the exterior of the cells is air, we prefer to provide a branch connection 19 which extends to a point just underneath the exterior of each cell. By these means the exterior of the cells are individually and efficiently cooled. If, however, the cooling medium for the lower compartments is water or other liquid, it is not so essential to provide a branch connection for each cell, but only to provide a plurality of such connections whereby the cooling liquid reaches each cell before becoming heated.

We show an outlet pipe 20 for each of the lower compartments and a common header 21 whereby the cooling medium may be removed by fans or pumps in any well known way, by connection to the inlet pipe 22 or the outlet pipe 23, as desired.

In some cases it may be desirable to artificially cool the air or liquid before its passage into the battery compartment.. This may be done in any well known way.

Having thus described our invention, what we claim is:

1. In a ventilating and cooling system for battery installations, a tank, a plurality of cells in said tank each containing plates and electrolyte, an air inlet pipe, a branch connection for each cell extending from said pipe to a point between adjacent plates and near the surface of the electrolyte, and an air outlet from said tank, whereby the electrolyte in each cell may be individually cooled and the noxious gases efficiently removed.

2. In a ventilating and cooling system for battery installations, a tank, a cell in said tank containing electrolyte and compactly arranged plates, an air inlet pipe, and a branch connection extending from said pipe to a point just above the surface of the electrolyte, said pipe being provided at its outer end with a flattened spout whereby it may project into the space between the plates.

3. In a ventilating and cooling system for battery installation, a tank, a cell in said tank containing electrolyte and compactly arranged plates, an air inlet pipe, and a branch connection extending from said pipe to a point just above the surface of the electrolyte, said pipe being provided at its outer end with a flattened and flared spout, whereby it may project into the space between the compactly arranged plates and cover an extended surface of said electrolyte.

4. In a ventilating and cooling system for battery installations, a tank, a plurality of cells in said tank, an inlet pipe for a cooling liquid extending within said tank, a plurality of branch connections from said pipe to points within the tank exterior to said cells, and an outlet from said tank, whereby the exterior of said cells may be efficiently cooled.

5. In a ventilating and cooling system for battery installations, a tank, a plurality of cells in said tank, an inlet pipe for a cooling liquid, a branch connection for each cell extending from said pipe to a point below the cell, and an outlet from said tank, whereby the cells are individually cooled exteriorly.

6. In a ventilating and cooling system for battery installations, a tank containing cells, means for inclosing said cells into gastight compartments, inlet and outlet pipes for each of said compartments, and a pipe connection from an inlet pipe to a point within each of said cells, whereby the electrolyte in each cell is separately cooled, and a plurality of discharge pipes for a cooling liquid connected to an inlet pipe, whereby the exterior of the cells is efficiently cooled.

7. In a ventilating and cooling system for battery installations, a tank containing cells, means for dividing said tank into upper and lower compartments, for each of the upper campartments an air inlet pipe having separate branch connections extending within the separate cells, for said lower compartment an inlet for a cooling liquid having a plurality of branch connections, and an outlet for each of said compartments, whereby both the interior and exterior of the cells are efficiently ventilated and cooled.

8. In a ventilating and cooling system for battery installations, a tank divided into upper and lower compartments, a plurality of cells in said tank, an inlet pipe for a cooling liquid extending within the lower compartment of said tank exteriorly of said cells, and an outlet pipe from the lower compartment for said liquid, whereby the exterior of the cells may be efficiently cooled with water or other liquid without permitting the liquid to enter the cells.

In testimony whereof we affix our signatures, in presence of two witnesses.

CHARLES H. BEDELL.
GRANT E. EDGAR.

Witnesses:
F. L. BRAKE,
W. D. FESLER.